United States Patent [19]
Shieh

[11] Patent Number: 5,613,387
[45] Date of Patent: Mar. 25, 1997

[54] LOCK THAT CAN BE USED INTERCHANGEABLY AS A LOCK AND A HAND TOOL

[76] Inventor: Jin R. Shieh, No. 178, Shih Chia Rd., Taichung, Taiwan

[21] Appl. No.: 596,754

[22] Filed: Feb. 5, 1996

[51] Int. Cl.⁶ .................................................. B62H 5/00
[52] U.S. Cl. .................................. 70/233; 70/225
[58] Field of Search .............. 70/233–236, 225, 70/226, 227, 14, 18, 38 A, 39

[56] References Cited

U.S. PATENT DOCUMENTS

| | | | |
|---|---|---|---|
| 4,180,998 | 1/1980 | Hellman | 70/233 X |
| 4,674,306 | 6/1987 | Halpern | 70/233 |
| 4,887,444 | 12/1989 | de Brouwer-Elzenbroek | 70/233 |
| 5,265,451 | 11/1993 | Phifer | 70/233 X |
| 5,379,618 | 1/1995 | Shieh | 70/233 X |
| 5,511,399 | 4/1996 | Lynn | 70/233 X |

FOREIGN PATENT DOCUMENTS

| | | | |
|---|---|---|---|
| 3102926 | 9/1982 | Germany | 70/233 |
| 3218305 | 11/1983 | Germany | 70/233 |
| 3438205 | 5/1985 | Germany | 70/233 |
| 4063785 | 2/1992 | Japan | 70/233 |
| 7503742 | 6/1975 | Netherlands | 70/233 |
| 8304009 | 11/1983 | WIPO | 70/233 |

*Primary Examiner*—Suzanne L. Dino
*Attorney, Agent, or Firm*—Browdy and Neimark

[57] ABSTRACT

A lock comprises a first retaining member, a second retaining member, a connection member, and a locking member. The locking member is mounted on the first retaining member or the second retaining member and is provided with a first retaining portion capable of a reciprocating motion. The connection member is fastened pivotally with the first or the second retaining member and is provided with a second retaining portion engageable with the first retaining portion. The connection member is further provided with one end which can be used for driving screws.

7 Claims, 2 Drawing Sheets

5,613,387

LOCK THAT CAN BE USED INTERCHANGEABLY AS A LOCK AND A HAND TOOL

FIELD OF THE INVENTION

The present invention relates generally to a motorcycle lock, and more particularly to a motorcycle lock which can be used interchangeably as a motorcycle lock and a hand tool for doing the simple repair chore of a motorcycle.

BACKGROUND OF THE INVENTION

The motorcycle is generally provided with a lock for disabling the motorcycle so as to prevent the theft of the motorcycle, and with a hand tool set for doing simple repair and maintenance works. It is conceivably inconvenient for a motorcycle operator to carry on the motorcycle a lock and a hand tool set in view of the fact that the motorcycle is provided with a very limited space intended for keeping the accessories.

SUMMARY OF THE INVENTION

It is therefore the primary objective of the present invention to provide a motorcycle lock which can be used interchangeably as a lock for preventing the theft of the motorcycle and as a hand tool for doing a simple chore of repairing the motorcycle.

It is another objective of the present invention to provide a motorcycle lock which can not be easily tampered with.

It is still another objective of the present invention to provide a motorcycle lock comprising component parts which can be separated so as to facilitate the easy storage of the lock.

The foregoing objectives of the present invention are attained by a motorcycle lock, which comprises a first retaining member, a second retaining member, a connection member, and a locking member. The locking member is mounted on the first retaining member or the second retaining member and is provided with a first retaining portion capable of a reciprocating motion. The connection member can be fastened pivotally with the first or the second retaining member and is provided with a second retaining portion engageable with the first retaining portion. The connection member is further provided with one end which can be used for driving screws.

DETAILED DESCRIPTION OF THE INVENTION

Figure 1:
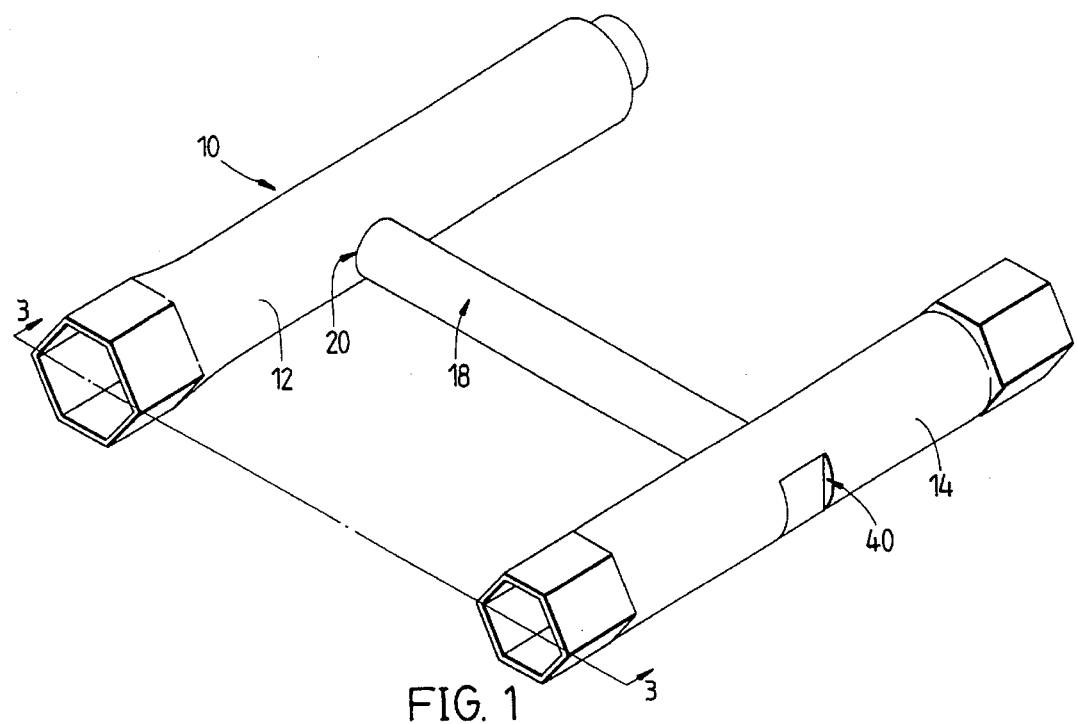
FIG. 1 shows a perspective view of a first preferred embodiment of the present invention.
Figure 2:
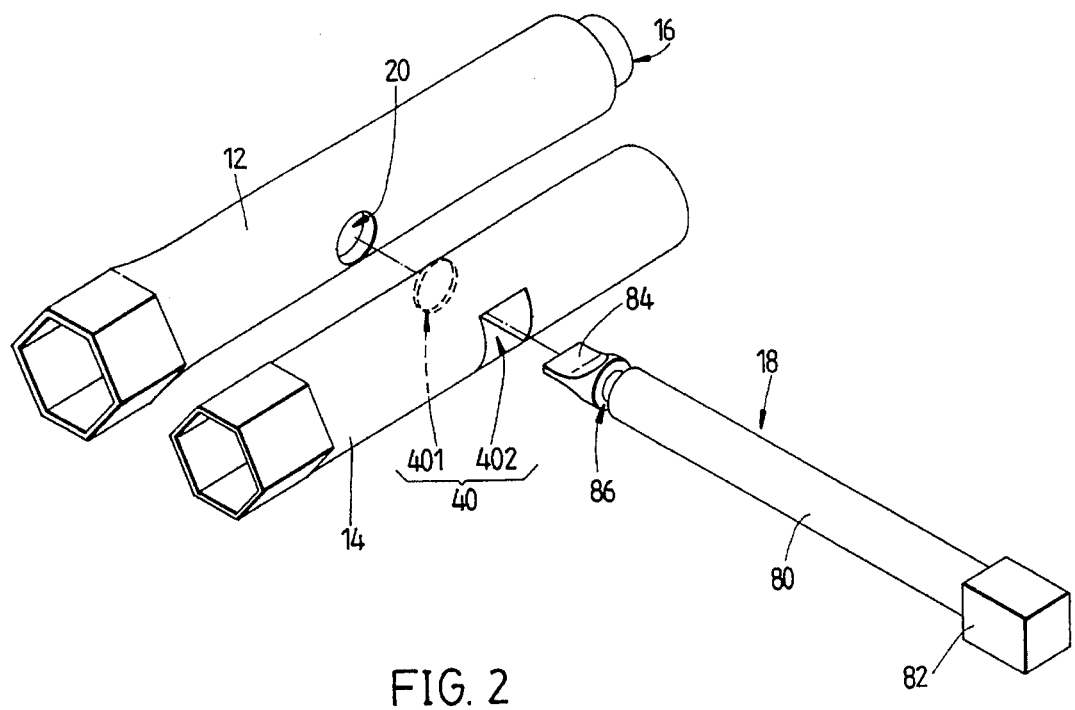
FIG. 2 shows an exploded view of the first preferred embodiment of the present invention.
Figure 3:
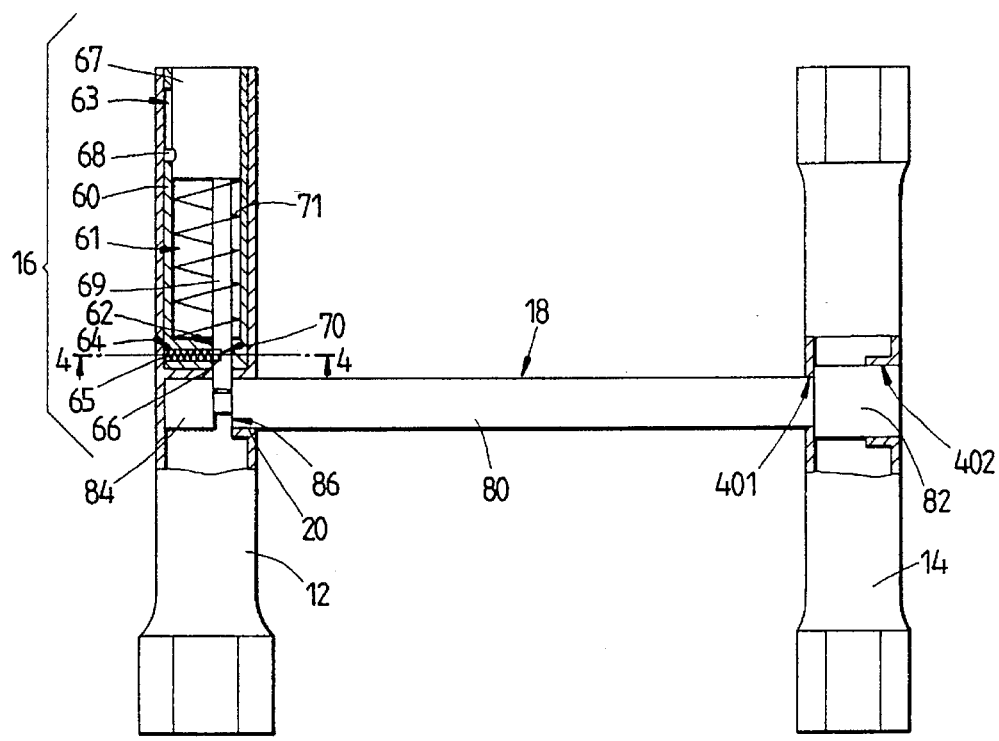
FIG. 3 shows a sectional view of a portion taken along the line 3—3 as shown in FIG. 1.
Figure 4:
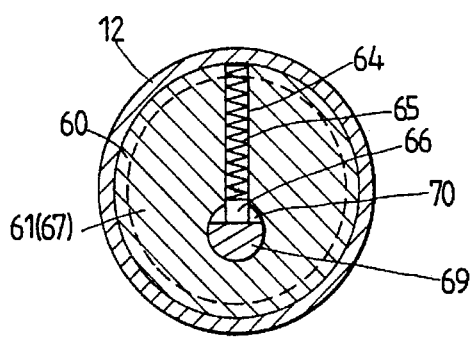
FIG. 4 shows a sectional view of a portion taken along the line 4—4 as shown in FIG. 3.

As shown in FIGS. 1–4, a motorcycle lock 10 of the first preferred embodiment of the present invention is composed of a first retaining member 12, a second retaining member 14, a locking member 16, and a connection member 18.

The first retaining member 12 is of a cylindrical construction and is provided at the midsegment thereof with a first locating hole 20. The first retaining member 12 has one longitudinal end of a hexagonal construction by punching and pressing, and another longitudinal end engageable with the locking member 16. The first locating hole 20 has an axis perpendicular to the longitudinal axis of the first retaining member 12.

The second retaining member 14 is of a cylindrical construction and is provided at the midsegment thereof with a second locating hole 40 such that the axis of the second locating hole 40 is perpendicular to the longitudinal axis of the second retaining member 14. The second retaining member 14 has two longitudinal ends which are hexagonal in construction by punching and pressing. The second locating hole 40 has an inner end 401 facing the first retaining member 12 and having a round shape. The second locating hole 40 has an outer end 402 of a square shape by punching and pressing.

The locking member 16 comprises a cylindrical body 60, which is snugly disposed in the interior of the first retaining member 12 and is provided along the direction of the axis thereof with a first recess 61 and a through hole 62 penetrating the bottom of the first retaining member 12. The cylindrical body 60 is provided in the inner fringe thereof with a retaining slot 63 and is further provided with a second recess 64 located between the outer fringe and the inner fringe of the through hole 62. The cylindrical body 60 is provided therein with a first spring 65 and a sliding block 66, and a lock core 67 which is slidably disposed in the cylindrical body 60. As the lock core 67 is caused to slide outwards, the outer end of the lock core 67 is located slightly outside the locking member 16 and the cylindrical body 60. The lock core 67 is provided on the periphery thereof with a retaining block 68 which can be caused to slide in the retaining slot 63. The lock core 67 is further provided in the inner side thereof with a first retaining portion 69 which is of a rod-shaped construction and is received in the first retaining member 12 via the through hole 62. The first retaining portion 69 is provided with a cut 70 contiguous to the outer edge of the lock core 67 and is fitted over with a second spring 71 such that the second spring 71 is located between the bottom of the first recess 61 and the lock core 67 which is exerted on by an outward force of the second spring 71.

The connection member 18 has a rodlike body 80 having an outer diameter smaller than the inner diameter of the inner end 401 of the second locating hole 40. The rodlike body 80 is provided at the right end thereof with an arresting portion 82 of a square columnar construction. The arresting portion 82 has an outer diameter greater than the inner diameter of the inner end 401 of the second locating hole 40 but smaller than the inner diameter of the outer end 402 of the second locating hole 40. The connection member 18 is provided at the left end thereof with a work portion 84 similar in construction to the tip of a screwdriver. Located on the right side of the work portion 84 is a second retaining portion 86 of a grooved ring and corresponding in location to the first retaining portion 69.

The motorcycle lock 10 of the present invention is used to disable the wheel of the motorcycle such that the left end of the connection member 18 is first put through the outer end 402 of the second locating hole 40 of the second locating member 14 and then through the inner end 401 of the second locating hole 40 before being moved leftwards to pass through a motorcycle felloe (not shown in the drawing) so as to enable the left end of the connection member 18 to be received in the first locating hole 20 of the first retaining member 12. In the meantime, the arresting portion 82 of the right end of the rodlike body 80 of the connection member 18 is received in the second locating hole 40. Thereafter, one end of the lock core 67, which is located at the outside of the first retaining member 12, is pressed to actuate the first retaining portion 69 to move inwards. As the lock core 67 is moved to an appropriate position, the end of the lock core 67 is received in the second retaining portion 86 of the rodlike body 80 of the connection member 18. As a result, the first retaining member 12 and the connection member 18 are located securely such that the sliding block 66 is forced by the first spring 65 to move into the cut 70, and that the first retaining portion 69 can not be disengaged.

The motorcycle lock 10 of the present invention can be used as a hand tool in such a manner that the work portion 84 of the connection member 18 is received in the first locating hole 20 so as to enable the connection member 18 to be used as a handle for driving the first retaining member 12 to turn a nut, a bolt or a spark plug. The motorcycle lock 10 of the present invention can be used as a hand tool in another manner that the arresting portion 82 of the connection member 18 is received in the second locating hole 40 so as to enable the second retaining member 14 to be used as a handle for driving the connection member 18 to work as a screwdriver.

The motorcycle lock 10 of the present invention can not be tampered with easily in view of the fact that the first retaining portion 69 and the second retaining portion 86 are fastened pivotally. As a result, only the first retaining member 12 and the connection member 18 are caused to turn when the first retaining member 12 or the second retaining member 14 is tampered with forcibly. In other words, the locking member 16 of the lock 10 of the present invention is immune from sabotage.

The motorcycle lock 10 of the present invention can be released by inserting a key into the lock core 67 so as to force the first retaining portion 69 to rotate. The rotation of the first retaining portion 69 results in the disengagement of the cut 70 with the sliding block 66, which is forced to move upwards so as to cause the second spring 71 to force the lock core 67 to actuate the first retaining portion 69 to move outwards to bring about the disengagement of the first retaining portion 69 with the second retaining portion 86. As a result, the connection member 18 is released.

Figure 5:
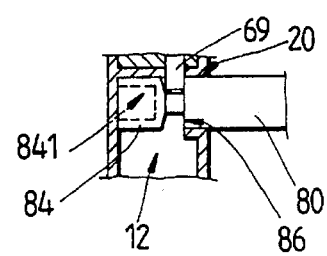
FIG. 5 shows a sectional schematic view of a second preferred embodiment of the present invention.

As shown in FIG. 5, the work portion 84 of the connection member 18 is provided with a recess 841 of a polygonal construction and engageable with bits or sockets of various specifications. The work portion 84 of the connection member 18 may be of a cruciform, tetragonal, or hexagonal columnar construction.

Figure 6:
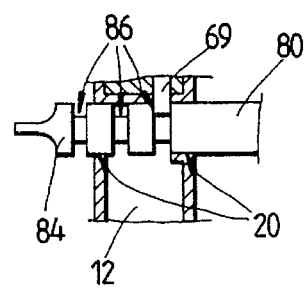
FIG. 6 shows a sectional schematic view of a third preferred embodiment of the present invention.

As shown in FIG. 6, the first locating hole 20 is a through hole passing through the periphery of the first retaining member 12. The connection member 18 is provided with a plurality of second retaining portions 86 to facilitate the user of the lock 10 to adjust as desired the distance between the first retaining member 12 and the second retaining member so as to accommodate the motorcycle wheels of various sizes.

What is claimed is:

1. A lock comprising:

a first retaining member provided with a first locating hole;

a second retaining member provided with a second locating hole;

a locking member mounted on said first retaining member such that a first retaining portion is driven by said locking member to move in a reciprocating manner, and that one end of said first retaining portion is moved into said first locating hole; and a connection member engageable with said first locating hole and said second locating hole and having one end provided with a work portion engageable with said first locating hole, said connection member further having another end provided with an arresting portion having an outer diameter greater than an outer diameter of said work portion and engageable with said second locating hole, said connection member still further having a rod body provided with a second retaining portion located between said work portion and said arresting portion;

wherein said first retaining member and said second retaining member are of a hollow construction and are provided respectively with one end of a polygonal and socket-like construction.

2. The lock as defined in claim 1, wherein said second locating hole is a through hole penetrating a periphery of said second rotating member and has one end with an inner diameter greater than an outer diameter of said work portion, said second locating hole further having another end with an inner diameter smaller than an outer diameter of said arresting portion of said connection member.

3. The lock as defined in claim 1, wherein said locking member has a cylindrical body mounted on said first retaining member, and a lock core disposed in said cylindrical body such that said lock core can be caused to move back and forth, and that said lock core can be moved to a predetermined position to enable one end of said lock core to be located outside said first retaining member and said cylindrical body so as to cause said first retaining portion to remain on said lock core, thereby enabling said first retaining portion to move back and forth along with said lock core and to rotate along an axis of said lock core.

4. The lock as defined in claim 1, wherein said first locating hole is a through hole penetrating a periphery of said first retaining member; and wherein said connection member is provided with a plurality of second retaining portions spaced at a predetermined interval.

5. The lock as defined in claim 4, wherein said second retaining portions are circular grooves located in a periphery of said connection member.

6. The lock as defined in claim 1, wherein said work portion of said connection member is similar in construction to bits of screwdrivers.

7. The lock as defined in claim 1, wherein said work portion of said connection member is columnar in construction and is provided with a recess of a polygonal construction.

* * * * *